S. DIXSON.
CORN-PLANTER.
No. 179,648.  Patented July 11, 1876.
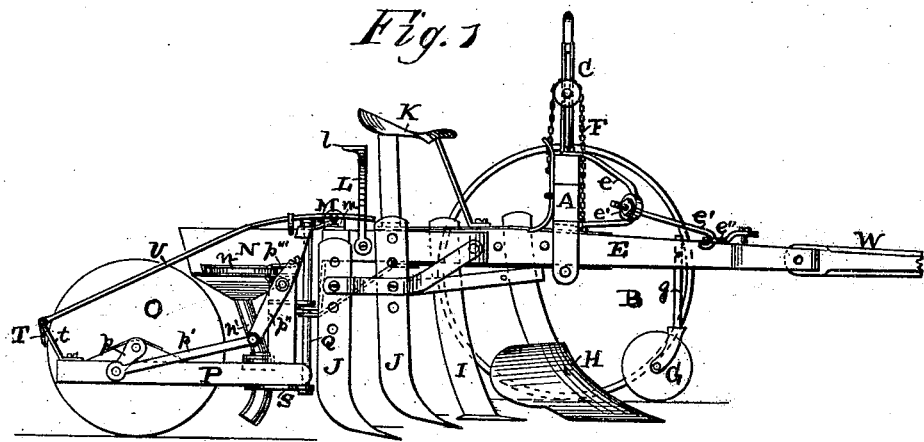
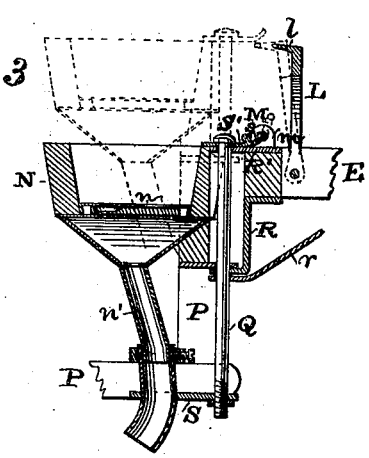
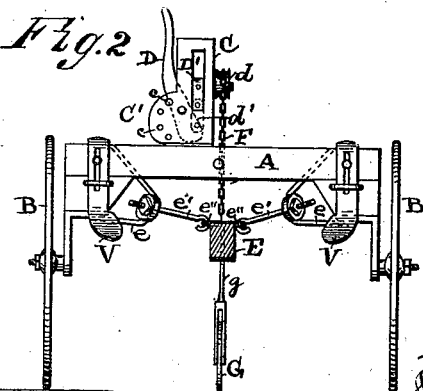
Witnesses:
L. Van Riswick.
D. G. Stuart
Inventor:
Stephen Dixson
by W. B. Richards & A. McCallum
Attys

UNITED STATES PATENT OFFICE.

STEPHEN DIXSON, OF ROSEVILLE, ILLINOIS.

IMPROVEMENT IN CORN-PLANTERS.

Specification forming part of Letters Patent No. 179,648, dated July 11, 1876; application filed February 26, 1876.

*To all whom it may concern:*

Be it known that I, STEPHEN DIXSON, of Roseville, county of Warren, and State of Illinois, have invented certain Improvements in Seeding-Machines, of which the following is a specification:

My invention relates to agricultural implements specially designed for the cultivation of corn or maize, and adapted more particularly to the preparation of the ground for and the planting of that crop, the operation of plowing or preparing the land and planting a row of corn being completed at each passage of the machine across the field.

The invention consists in certain new and improved devices and combinations of devices by means of which the machine is rendered more effective in operation, all as hereinafter more fully set forth.

In the accompanying drawings, Figure 1 is a side elevation of my improved machine. Fig. 2 is a rear elevation of the forward or axle portion of the machine, and Fig. 3 is a vertical sectional view of the seed-dropping apparatus, showing the devices for connecting it with frame-work which carries the plows.

Referring to the parts by letters, A represents an axle, supported on wheels B B, and and having a slotted standard, C, secured to its upper side. On one side of this standard is an arc-shaped projection, C', having a series of holes, c. D is a lever pivoted to the standard C. D' is a follower, having a shaft which projects through the standard and forms the spindle for pulley d. The lever D is connected with the follower D' by a connecting rod or link, d'. E is the plow beam or frame, which carries the plows. It is connected with and suspended from the axle A, by means of brace-bars e and adjustable links e' e', having hooked ends which pass through staples e'' secured to the beam. F is a chain, which is passed over the pulley d, one end being secured to the beam E and the other to the axle A. G is a cutter-wheel or colter, the standard G of which is secured to the beam E in front of the plows. H is a double mold-board plow, which operates in advance and removes the surface soil and turns it over on each side, so as to expose fresh soil, free from weed, seed, &c. I is a hoe-plow or furrow-opener, which follows immediately behind the plow H and prepares a suitable seed-bed. J J are ridging-plows, of which there are four, two on each side, the two in rear being wider apart than the others and working slightly deeper, so that the four form a ridge of loose soil with a furrow or depression in the middle for the reception of the seed. The plows J have adjustable standards, so that they can be made to run deep or shallow and at different depths, as desired. K is the driver's seat, mounted on suitable standards secured to the plow-frame E. L is a bracket, pivoted at its lower end to the frame E and having a rearward projection or hook, $l$, on its upper end. M is a bale or link, the ends of which are pivoted to standards $m$ secured to the rear end of the frame E. N is the seed-box, having oscillating seed-cup plates $n$ and seed-tube $n'$, through which the seed falls into the depression or furrow formed by the plows for its reception. O is a roller which follows the seed-dropping device and covers the corn after it is dropped. P is a frame in which the roller O is journaled and to which the seed-box N is secured. $p$ represents cranks in the projecting ends of the roller-spindles, and $p'$ are connecting-rods, pivoted at one end to the cranks $p$ and at the other to levers $p''$, which are pivoted to the frame P and connected with the oscillating seed-cup plates by links $p'''$, thereby imparting motion to the oscillating plates through the revolution of the roller. Q is a vertical rod or bolt, the lower end of which is secured by a screw and nut to the lower cross-bar of the frame P. R is a bracket secured to the under side of the rear end of the frame E, its lower end being formed into an eye, through which the bolt Q passes. $r$ is a brace-rod, connected at its upper end with the frame E and at its lower end with the bracket R, the bolt Q passing through it also. R' is a bracket, secured to the upper side of the rear end of the frame E, and projecting therefrom, the bolt Q passing through it also. S S' are brackets, secured to and projecting forward from the frame P, also provided with eyes or holes through which the bolt Q passes. The upper bracket S' projects over the rear end of the frame E, and has a turned-up or hooked end s. The bolt Q and brackets R R' and S S' constitute a hinged joint for connecting the frame P with the frame E, the connection being such that the frame P is free to rise and fall to a limited extent as the roller passes over inequalities of the ground, and to oscillate or turn laterally on the bolt Q to a limited extent, so as not to interfere with the operation of dropping and covering the seed.

To keep the roller in close contact with the ground, and to prevent any too sudden upward movement or jolting through clods or other obstructions to the even passage of the roller, yet permit of the necessary upward movement when passing over inequalities or depressions in the level of the field, the bale M is turned over the projecting or hooked end s of the bracket S'.

When the seeding device is not desired to operate, as in turning at the end of a row or in moving the machine from one field to another, the bale M is turned forward and the frame P may then be raised into the position shown by dotted lines in Fig. 3 of the drawings, and be secured in this elevated position by moving the hooked end of the pivoted bracket L backward under the bracket S'.

T is a scraper, pivoted to arms t t, which project upward from the rear end of frame P, and U is a lever for applying the scraper to the surface of the roller O, the end of the lever U being brought forward convenient for operation from the driver's seat. V V are adjustable foot-rests secured to the rear side of axle A. W is the draft-pole, pivoted to the forward end of the beam E.

When the plows are not in operation they are raised above the ground by means of the chain F and pulley d operated by the lever D; and the depth of penetration of the plows may be regulated by means of this lever D, and a pin passed through one or other of the holes c in the projection C' on the standard C.

Having thus described my invention, what I claim as new, and desire to secure by Letters Patent, is—

1. The bail or link M, operating in combination with the bracket S', having hooked end s, brackets S R R', and bolt Q, substantially as and for the purpose specified.

2. The pivoted bracket L, having hooked end l, operating in combination with the bracket S', brackets S R R', and bolt Q, substantially as and for the purpose specified.

3. The combination of the frame E, having plows H I J J, with the frame P, having roller O and seed-box N, the two frames being connected together and provided with the link M and pivoted bracket L, substantially as and for the purposes set forth.

In testimony that I claim the foregoing I have hereunto affixed my signature this 6th day of August, 1875.

STEPHEN DIXSON.

Witnesses:
 THOS. McKEE,
 P. R. RICHARDS.